June 14, 1960  F. GELLI  2,941,186
CIRCUIT MONITORING DEVICE
Filed Dec. 10, 1958

2,941,186
CIRCUIT MONITORING DEVICE

Francesco Gelli, 3 Via Bologna, Cagliari, Italy

Filed Dec. 10, 1958, Ser. No. 779,428

5 Claims. (Cl. 340—52)

This invention relates to monitoring systems and more particularly to monitoring devices adapted for operating with electrical circuits.

It is an object of the invention to provide a monitoring system for indicating the operation of a light or a similar electrical load.

Another object of the invention is to provide for establishing an alarm condition when an associated electrical apparatus fails to operate.

Still another object of the invention is to provide a monitoring device which is selectively adjustable to operate with a plurality of loads and which is adjustable to indicate the sequential occurrences of load failures.

In achieving the above and other of its objectives the invention contemplates the provision of a monitor system operative with at least two electrical loads and a voltage source. The system provided by the invention comprises an electro-magnetic device including an energizing winding, a magnetic core and a pivoted armature operatively disposed with respect to said core. The above winding is connected in series with said parallel loads and is, thus, effected by the conditions of the same. Means are provided connecting the aforenoted winding and loads in a complete circuit with said voltage source by the passage of electrical current therethrough. The invention further contemplates the provision of a spring connected to the above noted armature to resist the attraction of the same to said core. Moreover, means are operatively associated with the spring to control the force thereof, so that the moving of said armature is correlated to said loads. The armature is connected via said winding to the voltage source and an alarm is provided with a contact which is adapted to be coupled to the voltage source by said armature upon the attraction of the latter to said core.

In further accordance with the invention, the apparatus provided in accordance therewith is physically constructed so as to be readily applied to equipment already in use. For example, the invention defines particular use in connection with the light bulbs employed to illuminate license plates on automotive vehicles and it is an object of the invention to make apparatus of the invention readily applicable to vehicles already in use without requiring alteration of the same.

In addition, it is a further object of the invention, where the apparatus is to be employed in connection with lighting circuits, to provide simple auxiliary circuitry whereby the illumination power of the apparatus to be monitored is not decreased.

In addition, it is an objection of the invention to provide an apparatus which does not itself constitute a heavy load on the electrical installation to which it is applied.

Advantageously, the structure of the invention is very economical to manufacture and is readily incorporated into various structures with which it is intended to operate.

Other objects, features and advantages will become apparent from the following detailed description of a preferred embodiment of the invention as illustrated in the accompanying drawing.

Figure 1:
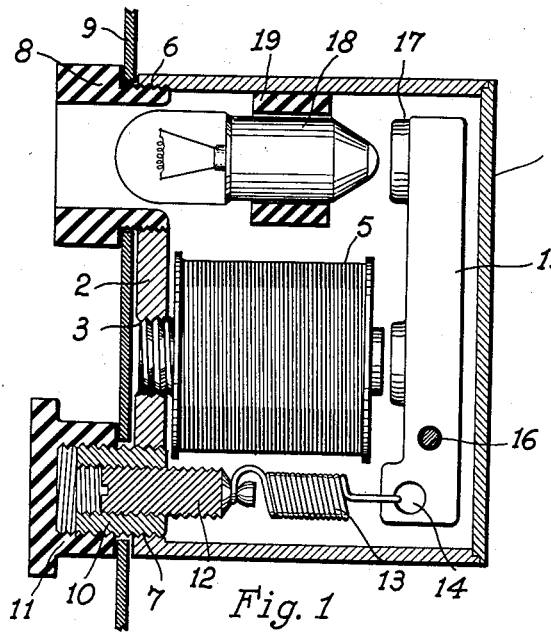
Fig. 1 shows a sectional view of the apparatus of the invention.

The apparatus according to this invention is arranged in a casing 1, in the front wall 2 of which a threaded hole 3 is provided in an approximately central location, wherein a special projection of the core of a magnet 5 is screwed. Near the ends of the wall 2, two more threaded holes 6, 7 are pierced, and a sleeve 8 is screwed in the former, this sleeve ending with an outer ring to grip the motor vehicle dashboard plate 9 between said ring and the edge of hole 6, plate 9 being correspondingly drilled at that point. Screwed in hole 7 is a sleeve 10 which is threaded inside and outside and on the outer periphery of which the cylindrical portion of a cap 11 is screwed, this portion also gripping dashboard plate 9 between its edge and the edge of hole 7 through a hole in dashbord at that point. A short peripheral portion of the inner end of sleeve 10 abuts on the end of the winding of magnet 5 facing wall 2. Screwed in the inner thread of sleeve 10 is a bolt 12 having an end extending into casing 1, one end of a helical spring 13 being fixed to said end, the other end being hooked in a hole 14 in one end of armature 15 operatively associated with magnet 5. This armature is shaped as a bar which is longer than the diameter of magnet 5, and is pivotally mounted on pin 16 a short distance from hole 14, its end which is remote from hole 14 carrying a contactor 17 which may come into contact with the base of an electric bulb 18 inserted in a lampholder 19 which is fixed to casing 1. Sleeve 8 may slide over bulb 18.

Figure 2:
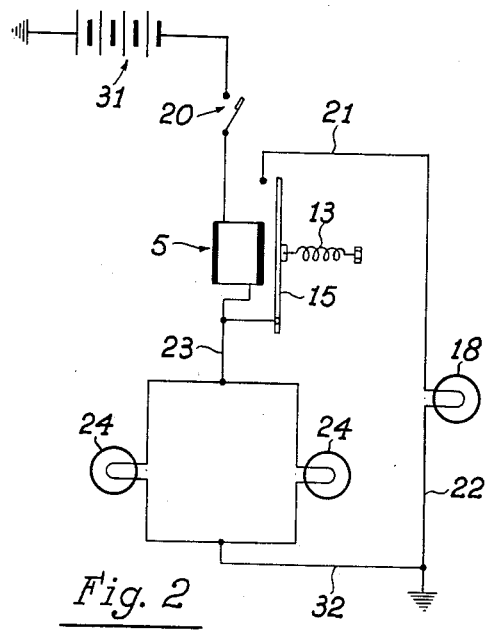
Fig. 2 is a circuit diagram for the apparatus of Fig. 1.

As shown in the diagram of Fig. 2, an electric current source 31 has one of its terminals grounded, the other terminal being connected through a suitable switch 20 to one end of the winding of magnet 5, the other end being connected to armature 15. Generally, it is desirable that the battery of the motor vehicle be used as the electric current source for the apparatus of the invention and thus, a special source may be dispensed with. In the diagrammatical showing of Fig. 2, the free end of armature 15 faces one end of a conductor 21, the other end thereof being connected to bulb 18. The end of armature 15 carrying contactor 17 may come into contact with the base of bulb 18 which is grounded through its own lampholder and conductor 22.

Figure 3:
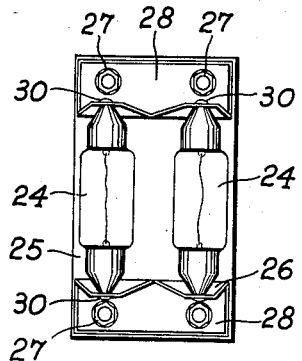
Fig. 3 is a top view of a pair of light bulbs for illuminating a motor vehicle number plate.
Figure 4:
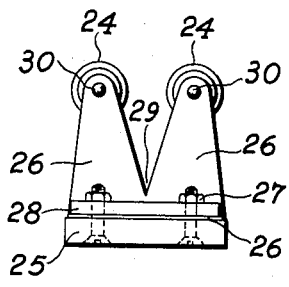
Fig. 4 is an end view of the pair of bulbs of Fig. 3.

Connected to the end of the winding of magnet 5 which is connected to armature 15 is a conductor 23 to which the two lamps 24 are connected in parallel. An arrangement of these lamps is shown by way of example in Figs. 3 and 4, from which it may be seen that two metal plates 26 are fixed to a base 25 made of an insulating material, each plate comprising a narrow flange, clamped between base 25 and an insulating plate 28 by small bolts 27. A much larger flange extends upwardly from base 25 at substantially a right angle and is preferably divided into two equal portions by a deep notch 29 which is V-shaped in the example shown. A recess 30 is formed near each of the ends of the larger flanges of the two plates 26, the opposed recesses 30 of the two larger flanges of plates 26 having their hollow surfaces facing each other. In each pair of opposed recesses thus formed, a tubular lamp 24 is inserted and held in place owing to the resiliency of the two plates 26, the lamps being a trifle longer than the distance between the pair of recesses.

The end of conductor 23 which is not connected to armature 15 is gripped between the smaller flange of one of plates 26 and base 25 in such a way as to make a good electrical contact with plate 26 and to be firmly held in place. In a similar way, one end of a conductor 32 is gripped between the smaller flange of the other metal plate 26 and base 25, the other end being grounded, for instance by connection with conductor 22, as shown in Fig. 2.

When switch 20 is closed, a current flows through the winding of magnet 5 and the two parallel lamps 24 to ground. By properly adjusting the strength of spring 13, the attraction exerted by magnet 5, thus energized, is made to overcome the action of the spring, and in this condition the contactor 17 will engage the base of pilot lamp 18, whereby the latter is energized and light emitted through the bore of sleeve 8. Now, should one of the number plate lamps 24 become extinguished, the current through the winding of magnet 5 will be decreased, and then the action of spring 13 on armature 15 will prevail; the contact of contactor 17 on the armature with the base of pilot lamp 18 will be broken, and lamp 18 will be extinguished, thus immediately warning the motor vehicle driver. Should he not be able to replace the lamp which has failed, he can adjust the strength of spring 13 by means of threaded pin 12, until the weaker current through the winding of magnet 5 is sufficient to attract armature 15. This is ascertained when the pilot lamp 18 is lighted again. If the remaining one of the two lamps 24 also fails after the latter adjustment, or if, with both lamps capable of being lighted, a fault occurs in their circuit preventing them from being lighted, the fact that pilot lamp 18 is put out will warn the motor vehicle driver immediately about the fault. This time, however, all attempts to set up current in the winding of magnet 5 to keep armature 15 attracted through adjustment of spring 13 will prove useless.

What I claim is:

1. A monitor system operable with at least two parallel electrical loads and a voltage source comprising an electromagnetic device including an energizing winding, a magnetic core and a pivoted armature operatively disposed with respect to said core, said winding being connected in series with said loads whereby to be affected by the condition of the loads, means connecting said winding and loads in a complete circuit with said voltage source for the passage of electrical current therethrough, a spring connected to said armature to resist the attraction of the same to said core, means operatively associated with the spring to control the force thereof so that the moving of said armature is correlated to said loads, said armature being connected via said winding to said voltage source, an alarm, and a contact coupled to said alarm and adapted to be coupled to said source by said armature upon attraction of the latter to said core.

2. A system as claimed in claim 1, comprising a casing supporting said electromagnetic device and pivotally supporting said armature, a member on said casing and including a threaded portion, and body threadably engaging said threaded portion for movement relative to said casing, said spring being connected between said body and armature and being adjustable by said body.

3. A system as claimed in claim 2, wherein said member extends through said casing, comprising a cop engaging said member for locking said casing on a support.

4. A system as claimed in claim 3, wherein said alarm is a light source, comprising a hollow threaded member extending through said casing and threadably engaging the latter, said hollow member being operatively disposed with respect to said light source so that the light can pass from said casing.

5. A system as claimed in claim 4, wherein the loads are two physically parallel light bulbs, comprising spaced bracket sections each including two upwardly extending parts provided with indentations for holding said bulbs, said sections being of electrically conductive material and leads connected to said brackets and connecting the bulbs in said circuit.

References Cited in the file of this patent

UNITED STATES PATENTS

| | | |
|---|---|---|
| 939,409 | Garretson et al. | Nov. 9, 1909 |
| 2,453,702 | Coulter | Nov. 16, 1948 |
| 2,803,811 | Turney | Aug. 20, 1957 |